June 30, 1925. 1,543,996
W. L. FRANKS
DEVICE FOR TRIMMING SOD
Filed Oct. 8, 1924
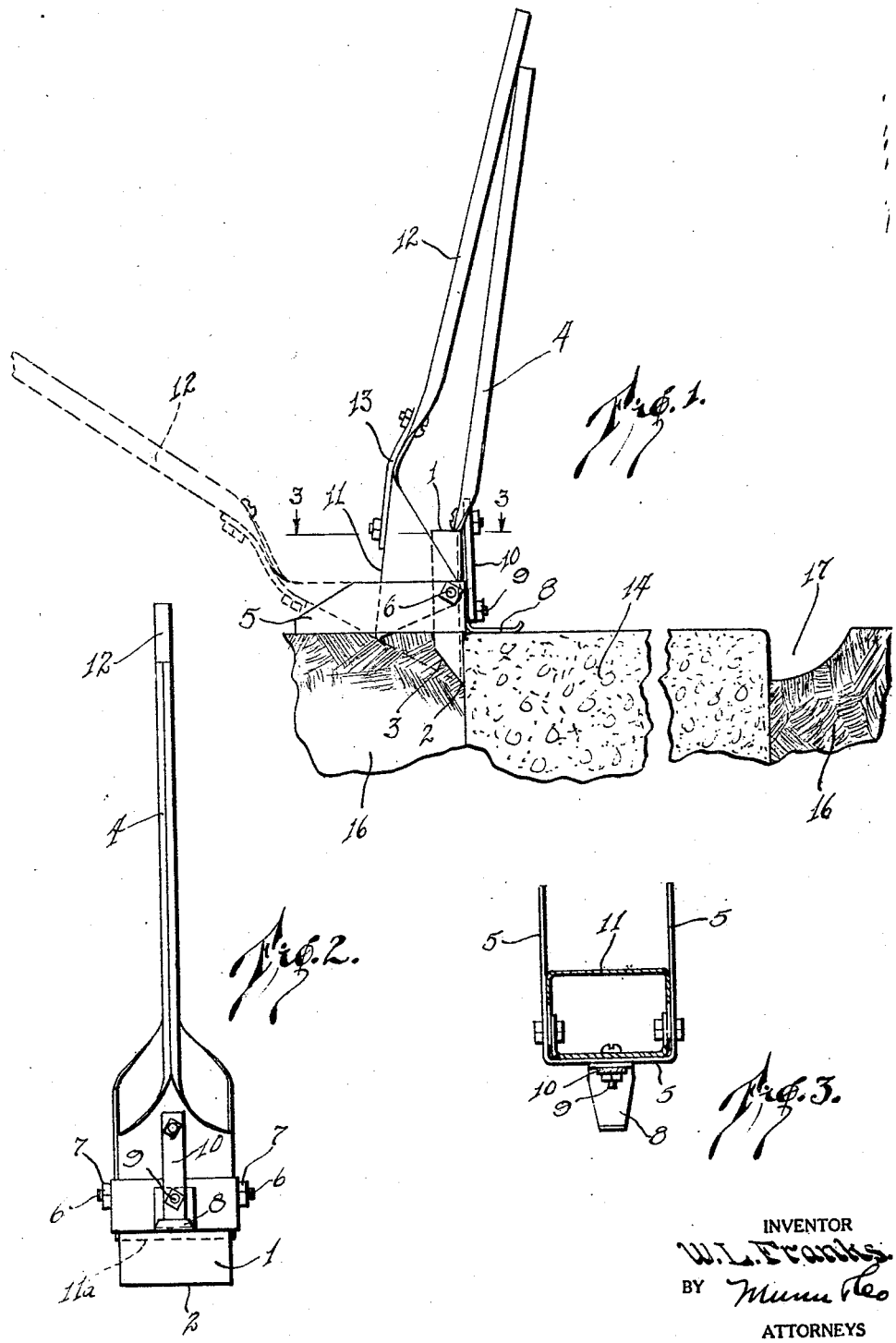
INVENTOR
W. L. Franks
BY
ATTORNEYS Patented June 30, 1925.

1,543,996

UNITED STATES PATENT OFFICE.

WILLIAM LEWIS FRANKS, OF LOUISVILLE, KENTUCKY.

DEVICE FOR TRIMMING SOD.

Application filed October 8, 1924. Serial No. 742,476.

*To all whom it may concern:*

Be it known that I, WILLIAM LEWIS FRANKS, a citizen of the United States, and a resident of Louisville, in the county of Jefferson and State of Kentucky, have invented a new and useful Improvement in Devices for Trimming Sod, of which the following is a full, clear, and exact description.

My invention relates to improvements in devices for trimming sod, at the edges of sidewalks, and it consists in the combinations, constructions, and arrangements herein described and claimed.

An object of my invention is to provide a device by means of which the sod at the edge of a sidewalk may be trimmed to provide a substantially V-shaped furrow at the edge of the walk, such as is ordinarily made by a spade.

A further object of my invention is to provide a device of the type described in which means is provided for regulating the width and depth of the cut, so as to make a furrow of uniform depth and width.

A further object of my invention is to provide a device of the type described by means of which a furrow of uniform depth and width may be quickly made, and the sod removed therefrom, the device serving as a means of lifting the sod, thus obviating the necessity of handling it with the hands.

Other objects and advantages will appear in the following specification, and the novel features of the invention will be particularly pointed out in the appended claims.

My invention is illustrated in the accompanying drawings forming a part of this application in which Figure 1 is a view of the device in operative relation with the sod adjacent to a side walk, Figure 2 is a view of the device at right angles to that shown in Figure 1, and Figure 3 is a section along the line 3—3 of Figure 1.

In carrying out my invention I provide a V-shaped cutter portion 1 having a cutting edge 2 at the bottom thereof, and provided with inclined or beveled cutting edges 3 at the sides. This cutter portion has a handle 4. In the present instance, I have shown the cutter portion and the handle as being integral, being formed of sheet metal. Carried by the cutter portion 1 is a U-shaped gauge member 5. This gauge member is secured to the side portions of the cutter by means of bolts 6 and nuts 7.

Projecting outwardly and in alignment with the bottom edge of the gauge 5 is a foot piece 8 which is secured to the cutter and to the gauge member 5 by means of a bolt 9, which passes through these members and also through a brace bar 10 which is secured to the rear face of the cutter in order to stiffen it.

A second cutter member 11 has side members which are also pivoted at 6. The cutter 11 has an integral handle 12, and is stiffened by a stiffening bar 13 attached to the outer side of the cutter. The bottom 11ª of the cutter 11 is parallel with the bottom 2 of the cutter 1, while the sides are of triangular shape, as shown in Figure 1.

From the foregoing description of the various parts of the device the operation thereof may be readily understood. In Figure 1 I have shown a sidewalk 14, and sod 16 on each side thereof. In using the cutter, the handles 12 and 4 are brought together. The edge 2 of the cutter 1 is placed adjacent to the edge of the sidewalk, and the cutter is forced downwardly by pressure on the foot-piece 8. When this piece comes in contact with the walk, the gauge member 5 will rest on the sod. Now, by forcing the handle 12 outwardly, the cutter 11 will describe an arc, and the sides of the cutter 11 will cut the sod as the arc is described, so that when the handle is swung to the dotted line position shown in Figure 1, there will be a section of the furrow, similar to that shown at 17, at the right hand side of Figure 1. Now, by lifting the device upwardly, the sod thus cut will be enclosed by the cutter blades so that it may be raised and passed over to a wheelbarrow or other suitable receptacle. Now, by pushing the handles together again, the blade will be opened up so as to permit the sod to be deposited in the receptacle or wheelbarrow. It will be seen that only three motions are required. First, the forcing of the cutter 1 downwardly, then the swinging out of the handle, and then the lifting. This may be done very rapidly, since the foot piece 8 and the gauge 5 limit the downward movement of the cutter. With the cutter 1 against the edge of the sidewalk the width of the cut is always the same so that when the end of the walk is reached, there is a neatly and accurately cut furrow. In this connection, it is observed that the sides of the cutter blades 1 and 11 act conjointly to sever the sections of the sod at the ends so that sections of definite length may be taken up at each operation.

I claim:

1. A sod trimming device comprising a cutter having a flat outer portion adapted to engage the edge of a side walk, a foot piece carried by said cutter, and adapted to contact with the upper face of the side walk, and a second cutter pivotally secured to the first named cutter, and having a cutting edge so formed as to be brought into substantial contact with the edge of the first named cutter.

2. A sod trimming device comprising a U-shaped cutter having a foot piece on the exterior thereof, a second cutter pivotally secured to said U-shaped cutter and having sod cutting edges, said second cutter being so pivoted as to be swung to bring its lower cutting edge into substantial engagement with the lower cutting edge of the first named cutter.

3. A sod trimming device comprising a U-shaped cutter having a foot piece on the exterior thereof, a second cutter pivotally secured to said U-shaped cutter and having sod cutting edges, said second cutter being so pivoted as to be swung to bring its lower cutting edge into substantial engagement with the lower cutting edge of the first named cutter, and a gauge member carried by said first named cutter on each side of said second named cutter, said gauge member having its lower edge in substantial alignment with the lower edge of said foot piece.

WILLIAM LEWIS FRANKS.